United States Patent

Togashi

[11] Patent Number: 5,244,082
[45] Date of Patent: Sep. 14, 1993

[54] APPARATUS FOR REMODELLING MULTI-PURPOSE CONTAINER HOLDER

[75] Inventor: Yasuo Togashi, Ishikawa, Japan

[73] Assignee: Shibuya Kogyo Co., Ltd., Ishikawa, Japan

[21] Appl. No.: 851,805

[22] Filed: Mar. 16, 1992

[30] Foreign Application Priority Data

Mar. 18, 1991 [JP] Japan .................................. 3-078637
Aug. 29, 1991 [JP] Japan .................................. 3-244740

[51] Int. Cl.$^5$ ............................................. B65G 47/84
[52] U.S. Cl. ............................. 198/803.01; 198/803.11
[58] Field of Search ..................... 198/803.01, 803.11, 198/803.14, 473.1; 29/33 P

[56] References Cited

U.S. PATENT DOCUMENTS

| | | | |
|---|---|---|---|
| 4,124,112 | 11/1978 | Mohney et al. | 198/803.11 X |
| 4,159,762 | 7/1979 | Bulwith | 198/803.14 X |
| 4,669,161 | 6/1987 | Sekelsky, Jr. | 29/33 P |
| 4,698,475 | 10/1987 | Lothenbach et al. | 198/803.01 X |
| 4,787,505 | 11/1988 | Tweedy | 198/803.11 X |
| 4,844,237 | 7/1989 | Petersen | 198/803.01 |
| 4,911,212 | 3/1990 | Burton | 141/369 |
| 5,060,781 | 10/1991 | Santandrea et al. | 198/803.01 X |

FOREIGN PATENT DOCUMENTS

2552735  4/1985  France .......................... 198/803.11

Primary Examiner—D. Glenn Dayoan
Attorney, Agent, or Firm—Flynn, Thiel, Boutell & Tanis

[57] ABSTRACT

A container holder which may be used in a container processing step as performed with a filling machine, a capping machine or the like to hold a container when positioning the latter is disclosed. A remodelling apparatus enables an efficient and reliable remodelling of a multi-purpose container holder 308 which can be used with a variety of containers. The container holder includes a body in which a plurality of fingers (container holding means) 318 are disposed for movement toward and away from the center of the holder. The container holder is conveyed on a remodelling line 302 which includes a resetting apparatus 310 for returning the respective fingers to their home positions which are used as a reference for positioning, a container model insertion device for inserting into the container holder a container model 344 having an outer profile slightly greater than the profile a particular container to be held, and a pusher 354 for moving the fingers into abutment against the container model to position them.

19 Claims, 16 Drawing Sheets

FIG.21
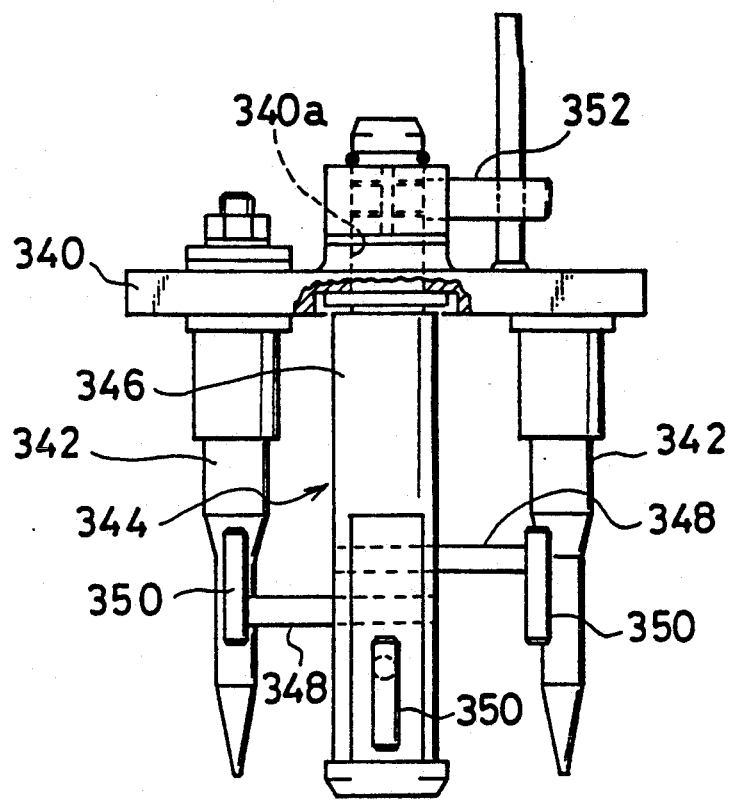
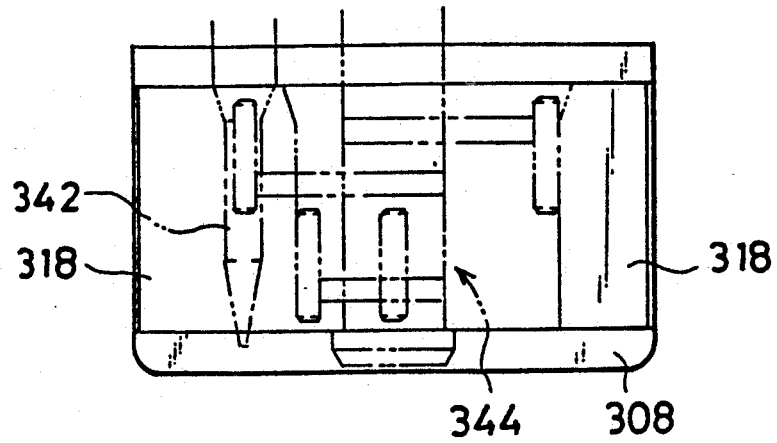

APPARATUS FOR REMODELLING MULTI-PURPOSE CONTAINER HOLDER

FIELD OF THE INVENTION

The invention relates to a container holder which is commonly referred to as a "skirt" which is to be used in a variety of container processing steps, such as a filling operation or a capping operation, to hold a container by a fitting engagement therewith in order to position such containers, and in particular, to an apparatus for remodelling a container holder designed especially to be usable with differing kinds of containers so as to conform to a selected configuration which is adapted to a particular container.

BACKGROUND OF THE INVENTION

In a variety of processing operations such as a filling or capping operation to be applied to containers having a varied cross-sectional configuration such as an elliptical cross section, the orientation or centering of containers has been conducted by fitting a container in a container holder as mentioned above before they are placed on a processing line.

However, such a container holder is generally formed as a body molded from a resin and which is provided with a receiving opening adapted to the configuration of a specific container. Accordingly, a particular holder cannot be used for containers of a different kind. If a plurality of container receiving openings are formed in the body in a manner that cross-sectional configurations of different containers cross each other, in actual practice, a single holder can be used with at most two kinds of containers.

Where many varieties of containers are to be treated, a number of container holders must be manufactured if the prior practice is followed. In addition, a number of difficulties have been experienced with the need to provide a space for storage of the holders and their placement onto a processing line.

SUMMARY OF THE INVENTION

Accordingly, it is an object of the invention to provide a container holder which can be used with a variety of containers in common, and also to provide an apparatus for remodelling such a container holder to a specific configuration adapted to a particular container in an efficient and reliable manner.

The above object is accomplished in accordance with the invention by the provision of a plurality of container holding means disposed in a container holder which receives a container and are movable toward the center of the holder, and a combination of resetting means for resetting the container holding means to their home positions and positioning means for moving and positioning the container holding means, both being mounted on a remodelling line which conveys such container holder.

BRIEF DESCRIPTION OF THE DRAWINGS

The above other features and advantages of the invention will become apparent from the following description of the several embodiments with reference being made to the drawings, in which:

FIG. 21 is a front view of the remodelling station.

DESCRIPTION OF THE PREFERRED EMBODIMENTS

Figure 1:
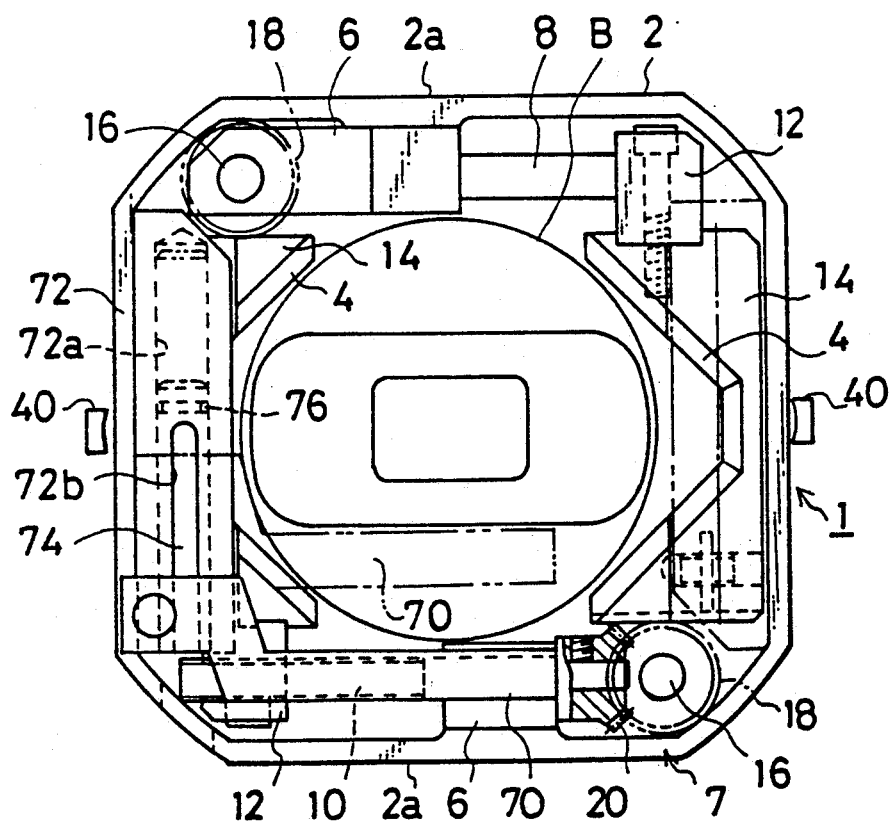
FIG. 1 is a plan view of a container holder as may be used in a remodelling apparatus according to one embodiment of the invention.
Figure 2:
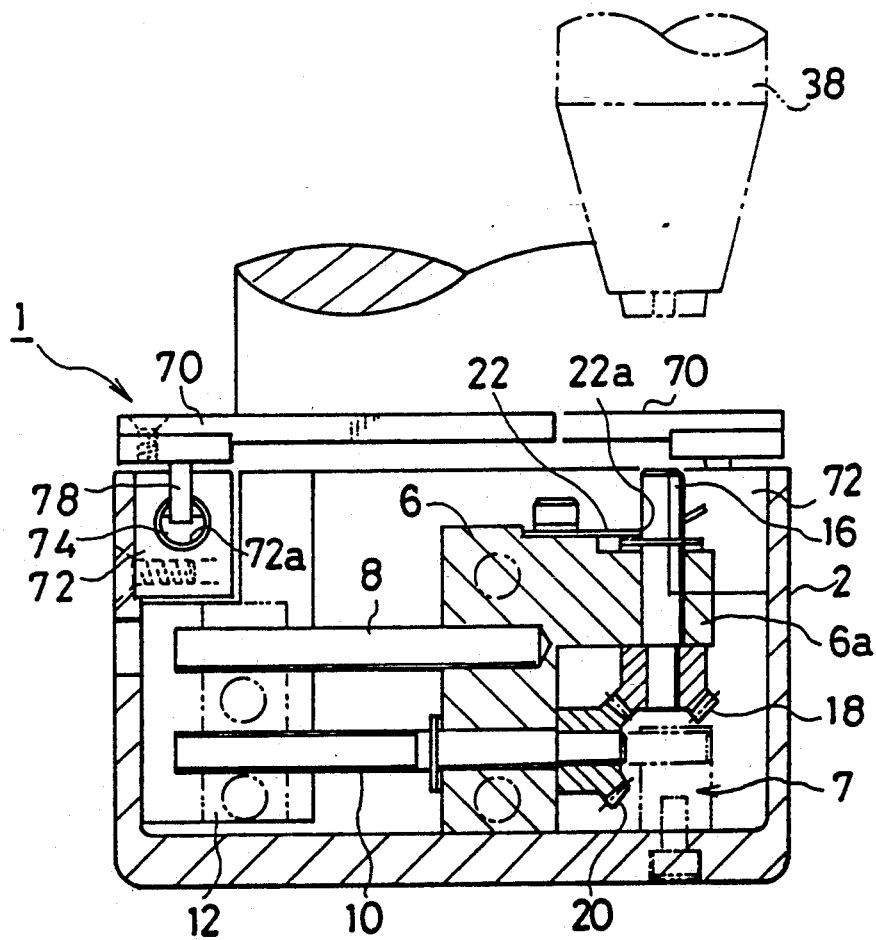
FIG. 2 is a longitudinal section of the container holder.
Figure 3:
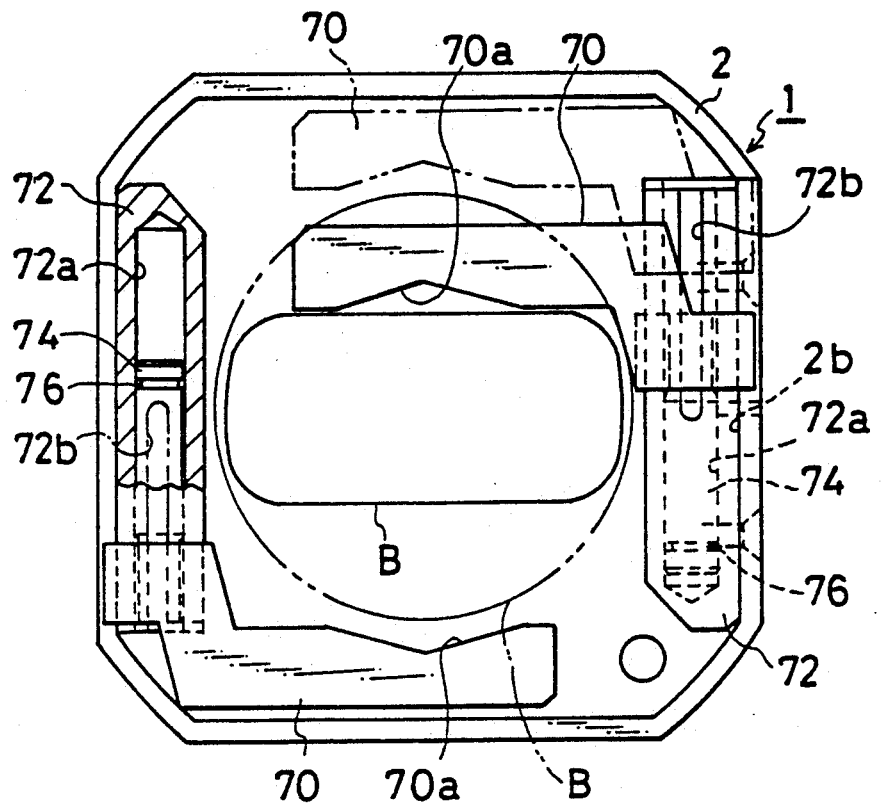
FIG. 3 is a plan view of auxiliary fingers of the container holder.
Figure 4:
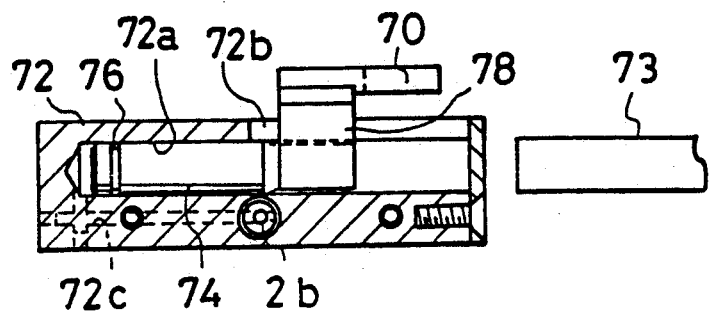
FIG. 4 is a longitudinal section of the auxiliary finger of the container holder.

Referring to the drawing, several embodiments of the invention will now be specifically described. Referring to the drawings, a container holder 1 which is used in an embodiment of the invention comprises a tubular casing 2 (holder body) having a closed bottom and which is rectangular in cross section, and a pair of V-fingers (container holding means) 4 disposed in opposing relationship with each other within the casing 2 and adapted to be driven for reciprocatory movement toward and away from each other as shown in FIGS. 1-4.

The tubular casing 2 is substantially in the form of a square in section, the four corners of which are cut off and replaced by arcs of a circle to present a substantially octagonal configuration. It includes a pair of sidewalls 2a, which are vertically spaced apart opposite to each other, as viewed in FIG. 1, to which support members 6 are secured, respectively. The support members 6 carry a pair of vertically spaced rods 8, 10 which extend in parallel relationship with the sidewalls 2a. The upper rod 8 represents a guide rod secured to the support member 6 while the lower rod 10 represents a screw which is rotatably carried by the support member 6.

The screw 10 threadably engages a nut 12, and as the screw 10 is turned, the nut 12 is driven forth and back along the guide rod 8. Finger mounts 14 having recesses formed in their opposing surfaces are secured to the respective nuts 12 which are threadably engaged with the screws 10 disposed on two opposite lateral sides of the casing 2, and the V-finger 4 is mounted in such recess.

The V-finger 4 is driven toward and away from the center of the tubular casing 2 by reciprocating means 7, to be described later. A top portion of the support member 6 extends in a direction opposite from the two rods 8, 10, and such extended top portion 6a carries a vertically oriented rotary shaft 16 (operating shaft). A bevel gear 18 is mounted on the lower end of the rotary shaft 16, and meshes with another bevel gear 20 which is secured to an end of the screw 10. Accordingly, by rotating the both rotary shafts 16, the pair of V-fingers 4 can be driven back and forth toward or away from each other.

A leaf spring 22 is secured to the top surface of the V-support member 6, and has its one end curved upwardly, and in the region of such curvature, it is formed with a circular opening 22a of a diameter which is slightly greater than the external diameter of the rotary shaft 16. The top portion of the rotary shaft 16 extends through the circular opening 22a formed in the leaf spring 22, and in the unstressed condition of the leaf spring 22, i.e., when it is curved upwardly, the inner surface of the circular opening 22a engages the lateral side of the rotary shaft 16 to lock it against rotation. However, when the curved end of the leaf spring 22 is forced down, the rotary shaft 16 is freely rotatable.

In addition to the V-fingers 4, the holder 1 is also provided with a pair of auxiliary fingers 70 (container holding means) which are disposed for movement back and forth in a direction perpendicular to the direction along which the V-fingers 4 move.

On the rear side of the respective V-fingers 4, the wall of the casing 2 has, in its upper region, a pair of cylinder blocks 72 secured thereto. A cylinder opening 72a is formed in each cylinder block 72, but the cylinder opening in one of the cylinder blocks 72 extends in the opposite direction from the cylinder opening in the other cylinder block. A pin cylinder 74 is slidably fitted in each cylinder opening 72a. An O-ring 76 is fitted around the distal end of the pin cylinder 24 which is located innermost within the opening 72a, and the friction of the O-ring 76 is effective to maintain the pin cylinder in position. The casing 2 is formed with an air inlet 2b and the cylinder block 72 is formed with an air passage 72c (for both see FIG. 4), through which air can be introduced into the innermost portion of either cylinder opening 72a. Such air acts upon the pin cylinder 74 to retract it toward the opening end of the cylinder opening 72a.

The auxiliary finger 70 is substantially L-shaped, and is mounted on the top of the rear end, located adjacent to the opening end of the cylinder opening 72a, of the respective pin cylinder 74 by means of a mounting plate 78. The auxiliary fingers 70 are formed with shallow V-shaped recesses 70a in their opposing surfaces. An elongate slot 72b is formed in the top wall which defines the cylinder opening 72a, and the mounting plate 78 is movable within the slot 72b.

Figure 5:
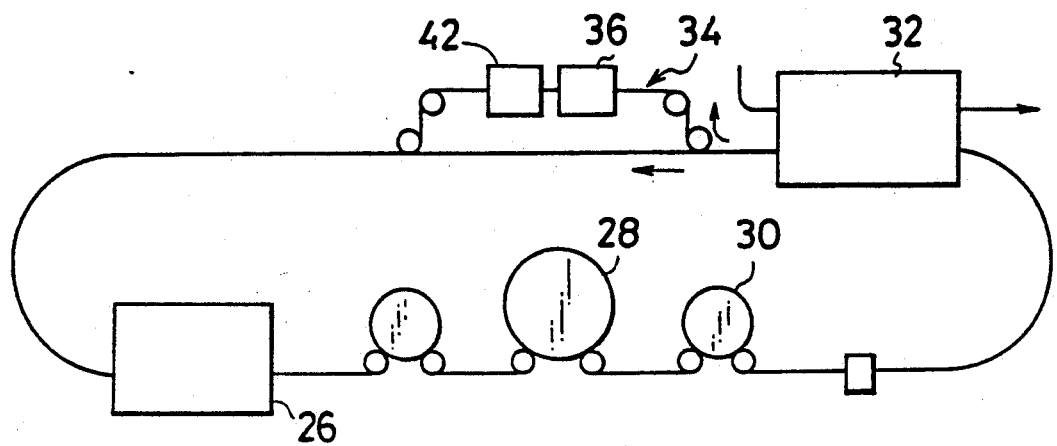
FIG. 5 is an illustration of an exemplary container processing line which utilizes the container holder.

A remodelling operation of the container holder mentioned above, namely, an operation to remodel the container holder so as to adapt itself to a container of a different size or configuration will now be described. The remodelling operation takes place on a remodelling line which is connected to, but is separate from the usual container processing line which includes a filling machine, a capping machine or the like. FIG. 5 shows an example of such remodeling line. Normally, a container B is inserted into a container holder within an unscrambler 26, and is then fed through a filling machine 28, a capping machine 30 and the like where a desired processing operation takes place sequentially, and the container B is taken out of the holder at a caser 32 for packaging, and the emptied container holder returns to the unscrambler 26. However, when a remodelling operation is desired, the container holder is diverted to a remodelling line 34 which bypasses part of the normal processing line. Initially, the container holder is fed to a home position resetting station 36 on the remodelling line 34 where a pair of servo drivers 38 (see FIG. 2) are fitted around the both rotary shafts 16 to rotate it, thus returning the V-fingers 4 to their home position which represents a reference position when adjusting the V-fingers, and which is the most retracted position of the V-fingers 4 in this embodiment. The resetting to the home position is confirmed by detecting the end of the respective V-finger 4 by means of a proximity sensor 40 (see FIG. 1) disposed adjacent to the station 36. It is to be understood that the proximity sensor 40 may be replaced by a different kind of sensor such as a contact sensor, for example. The resetting station 36 is followed by an automatic remodelling station 42 where the servo drivers are driven to rotate through a given number of revolutions which is predetermined depending on the type of a particular container, thus advancing the pair of V-fingers 4 to positions where they can receive the particular container B with a close clearance.

Figure 13:
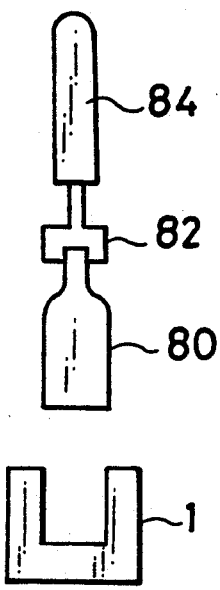
FIG. 13 is a schematic view of one form of container model insertion means.

Subsequently, air is supplied through the air inlet 2b formed in the casing 2 to return both pin cylinders 74 to their home positions or the most retracted positions. A container sample or a remodelling jig is inserted into the space defined by the pair of V-fingers 4 and the pair of auxiliary fingers 70. As illustrated in FIG. 13, the top of a container sample 80 may be gripped by a gripper 82, and may then be lowered into the container holder 1 by means of a cylinder 84. A push pin 73 (see FIG. 4) is then inserted through the open end of either cylinder opening 72a to drive the pin cylinder 74 inward until the associated auxiliary finger 70 comes into contact with the container sample, whereupon the remodelling operation is completed.

It will be seen that the container holder 1 mentioned above includes the pair of V-fingers 4, which can be moved back and forth toward or away from each other to allow any desired spacing therebetween to be freely established, and thus a single container holder may be used with a variety of containers. While the use of the V-fingers 4 alone may fail to hold a container which is square-shaped in cross section in exact angular position, the pair of auxiliary fingers 70 prevent such instability from occurring, assuring that any container can be retained in place in a reliable manner. Since the auxiliary fingers 70 are remodelled by inserting a container model, they can be positioned very rapidly and exactly. It is to be understood that the remodelling line 34 need not be connected to the container processing line as mentioned above, but may be provided as an independent line to enable a devoted remodelling of a quantity of container holders 1.

Figure 6:
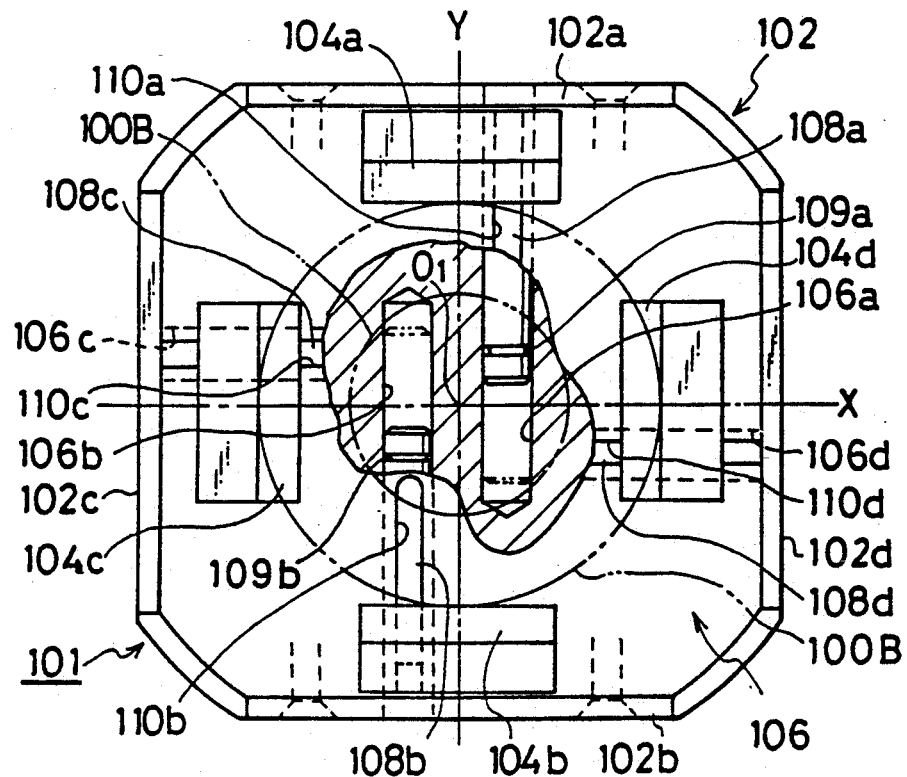
FIG. 6 is a plan view of another example of container holder.
Figure 7:
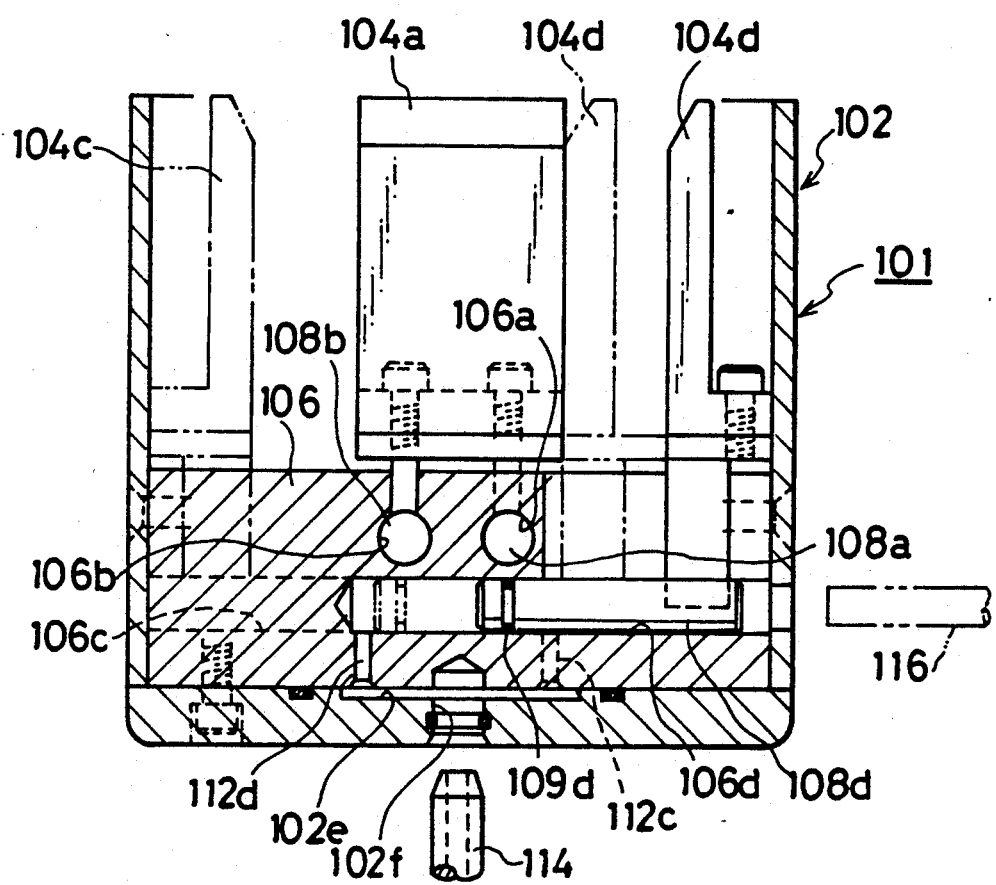
FIG. 7 is a longitudinal section of the container holder shown in FIG. 6.

Referring to FIGS. 6 and 7, there is shown another example of container holder. Disposed in a tubular casing (holder body) 102 having a rectangular cross section and having a closed bottom are four container holding members 104a, 104b, 104c and 104d in a reciprocable manner. The casing 102 is substantially in the form of a square in section, and the four corners are cut off and replaced by arcs of a circle to present generally a substantially octagonal configuration. A container receptacle 106, having openings to be fitted by pin cylinder to be described later, an air passage or the like, is placed on and secured to the bottom. In its upper portion, the receptacle 106 is formed with a pair of cylinder openings 106a, 106b which are disposed on the opposite sides of a bisector line Y, passing through the center $0_1$ of the container holder and dividing the interior of the holder into two equal portions, and which extend from opposite or upper and lower sidewalls 102a, 102b of the casing toward and beyond the center in parallel relationship with the line Y. At a location below the cylinder openings 106a, 106b, a pair of cylinder openings 106c, 106d are disposed on the opposite sides of a line X which is perpendicular to the line Y and extend from the opposite lateral sidewalls 102c, 102d of the casing toward and beyond the center of the casing in parallel relationship with the line X. Each of the four cylinder openings 106a, 106b, 106c and 106d extend beyond the center of the container receptacle 106, but each opposing pair runs parallel to each line X or Y on opposite sides thereof, and one pair is located at a different elevation from the other pair, so that they cannot intercept with each other within the receptacle.

Pin cylinders 108a, 108b, 108c and 108d are slidably fitted in the cylinder openings 106a, 106b, 106c and 106d, respectively. The container holding members 104a, 104b, 104c and 104d are fixedly mounted on the respective pin cylinders 108a, 108b, 108c and 108d, respectively. Elongate slots 110a, 110b, 110c and 110d are formed in the receptacle 106 at respective locations above the associated cylinder openings 106a, 106b, 106c and 106d, respectively, and extend to the upper surface of the receptacle 106, whereby the container holding members 104a, 104b, 104c and 104d are reciprocable with the pin cylinders 108a, 108b, 108c and 108d, respectively, within an extent defined by these elongate slots 110a, 110b, 110c and 110d, respectively. O-rings 109a, 109b, 109c and 109d are fitted over the free end of the pin cylinders, 108a, 108b, 108c and 108d, respectively, and their friction is effective to prevent a movement of the associated pin cylinder when the latter is inoperative.

A recess 102e is centrally formed in the upper surface of the bottom of the casing 102, and the container receptacle 106 is formed with air passages 112a, 112b, 112c and 112d (112a and 112b being not shown) which provide a communication between the recess 102e and the inner tip end of the respective cylinder openings 106a, 106b, 106c and 106d. The bottom of the casing 102 is formed with a supply port 102f through which the air is introduced into the recess 102e from the outside.

A remodelling of the container holder 101, namely, an adjustment to be made to cause the holder 101 to adapt to a different container configuration, will now be described. At a home station on a line on which the container holder 101 is conveyed, an air coupler 114 (see FIG. 7) is inserted into the air supply port 102f in the bottom surface of the casing 102, and the air pressure is utilized to cause the pin cylinders 108a, 108b, 108c and 108d to be returned to their start position within the associated cylinder openings 106a, 106b, 106c and 106d (in the present embodiment, the position where each of the container holding members 104a, 104b, 104c and 104d retracts to their full extent to abut against the inner surface of the sidewalls 102a, 102b, 102c and 102d of the casing 102). Subsequently, at a remodelling station of the conveying line, container model or remodelling jig is inserted inside the four container holding members 104a, 104b, 104c and 104d, and four remodelling push pins 116 are inserted into the respective cylinder openings 106a, 106b, 106c and 106d, and the pin cylinders 108a, 108b, 108c and 108d are driven inward until the associated container holding members 104a, 104b, 104c and 104d move into abutment against the respective container models.

Such movement of the container holding members 104a, 104b, 104c and 104d in conformity to the container model allows a container of any configuration to be held in a stable manner within the space defined by the four container holding members.

Figure 8:
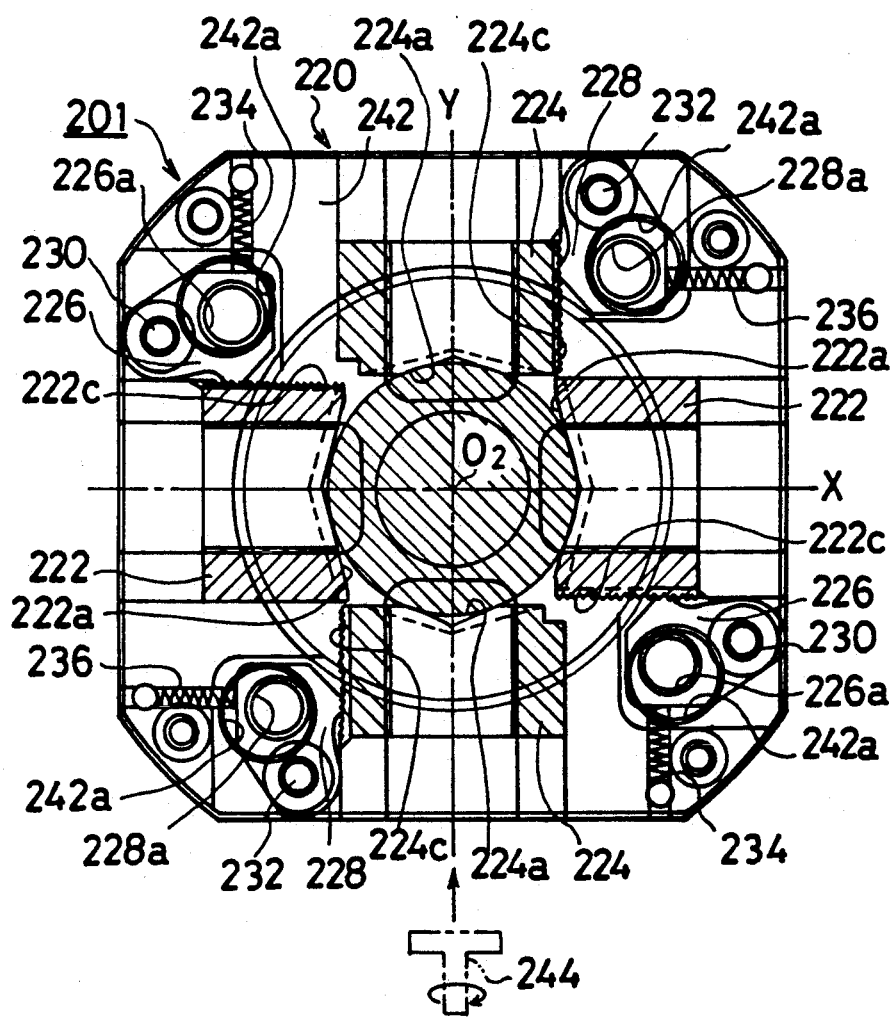
FIG. 8 is a plan view of a third example of container holder.
Figure 9:
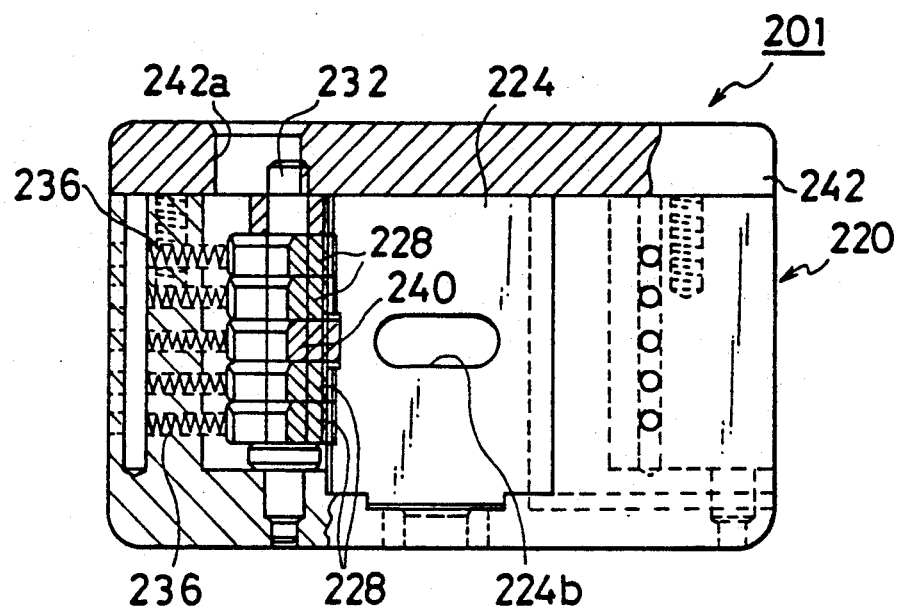
FIG. 9 is a side elevation, partly in section, of the container holder shown in FIG. 8.
Figure 10:
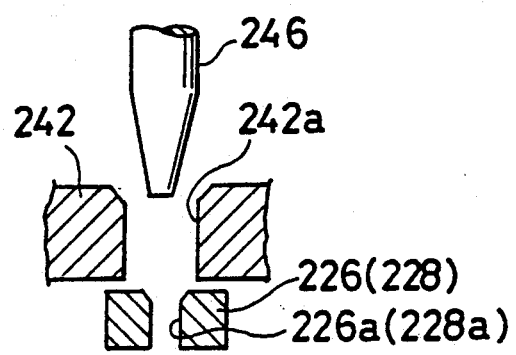
FIG. 10 is an illustration of disengaging a ratchet.

Referring to FIGS. 8 to 10, a third example of container holder will now be described. In this instance, a container holder comprises a holder body 220, and two pairs of fingers or container holding members 222, 224, the fingers of each pair being disposed in opposing relationship to each other on one of orthogonal lines X or Y which passes through the center $0_2$ of the holder body 220. Each finger 222 or 224 is reciprocable on the associated line X or Y, and the opposing surfaces are formed with V-shaped recesses 222a, 224a. The rear surface of each finger 222, 224 is formed with a slot 222b or 224b (222b being not shown) (see FIG. 9) which receives a transversely elongate T-shaped jig 244 (see FIG. 8).

One lateral surface of each finger 222, 224 is formed with a number of teeth 222c, 224c, and ratchets 226, 228 are disposed laterally adjacent to the finger teeth 222c, 224c for meshing engagement with their teeth. Each ratchet 226, 228 is rotatable about a fulcrum pin 230, 232, but is urged by an associated spring 234 or 236 which engages their rear surface into meshing engagement with the associated finger teeth 222c or 224c. In the present embodiment, the meshing engagement between the finger teeth 222c, 224c and the ratchet 226, 228 prevents a movement of the finger teeth 222c, 224c toward the center of the holder 220, but the tooth configuration may be modified to provide a stop in either direction. As shown in FIG. 9, the ratchet 226, 228 comprises a plurality of divided sections for the purpose of assuring a meshing engagement of teeth in any one of these sections with the finger teeth 222c, 224c as a result of slight differences in the sizes of the individual sections. Anti-rattling brakes 238, 240 (238 being not shown) are disposed intermediate the upper two and the lower two sections of the ratchets 226, 228, but may be dispensed with under certain instances.

A top cover 242 is secured around the outer periphery of the holder body 220, and is formed with four circular holes 242a at locations directly above the ratchets 226, 228. On the other hand, the ratchets 226, 228 are formed with circular holes 226a, 228a of a reduced diameter at a position which is eccentric from the circular hole 242a when the ratchets are urged by the springs 234, 236 into meshing engagement with the finger teeth 222c, 224c.

In operation, T-shaped jig 244 (see FIG. 8) is inserted through the transversely elongate slot 222b, 224b formed in the rear surface of each finger 222, 224 at the home station, and then is rotated to engage it with the inner surface of the opening 222b, 224b to allow the fingers 222, 224 to be pulled to return them to their start position (where the fingers 222, 224 have retracted through its full extent).

Figure 14:
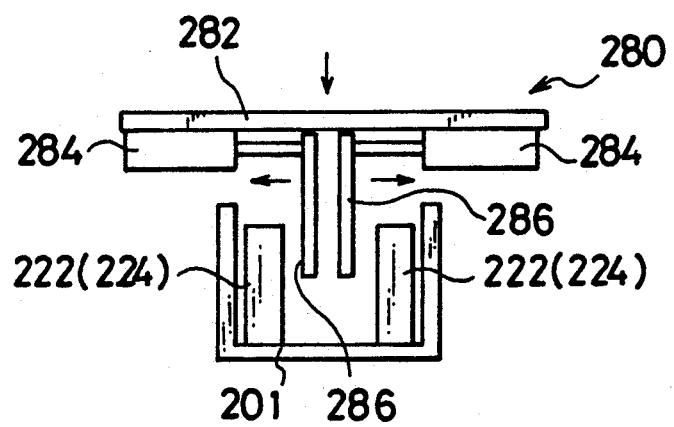
FIG. 14 illustrates one form of retraction means.
Figure 15:
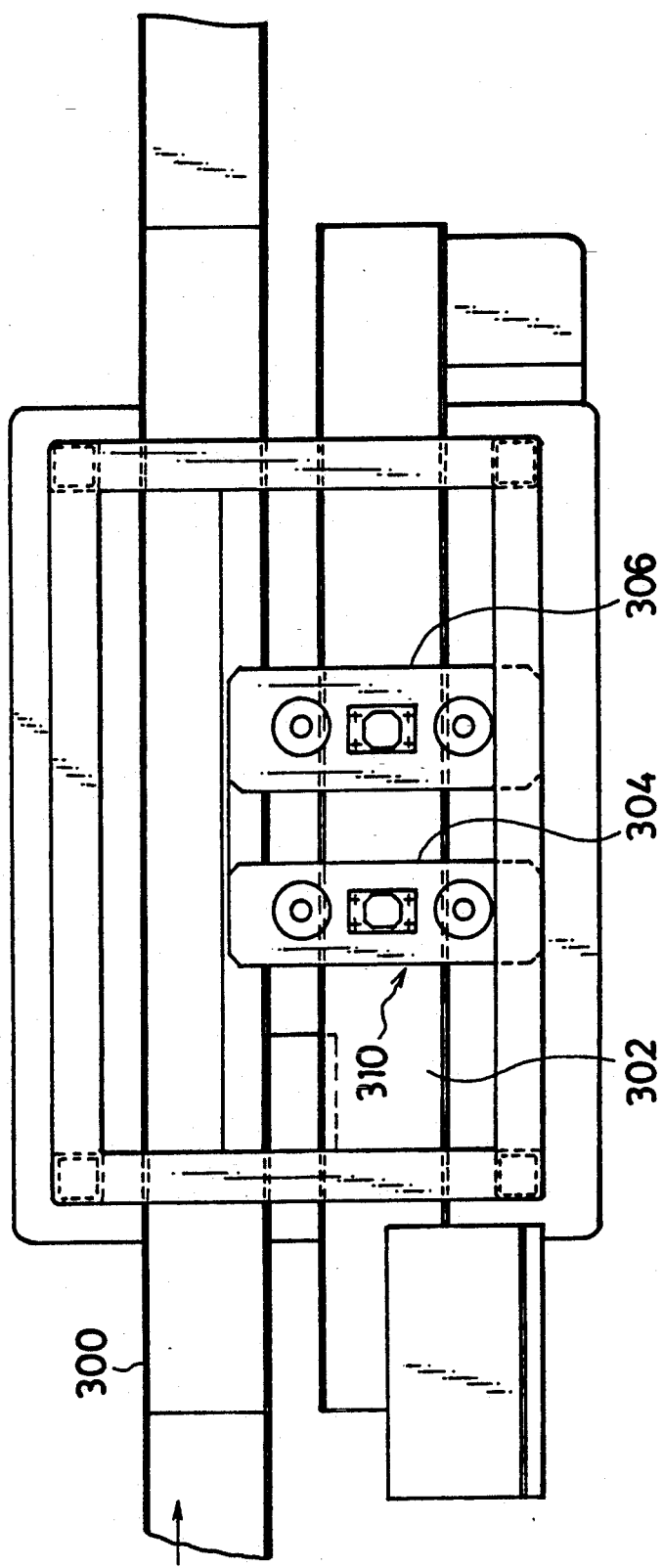
FIG. 15 is a plan view of a remodelling apparatus according to another embodiment of the invention.
Figure 16:
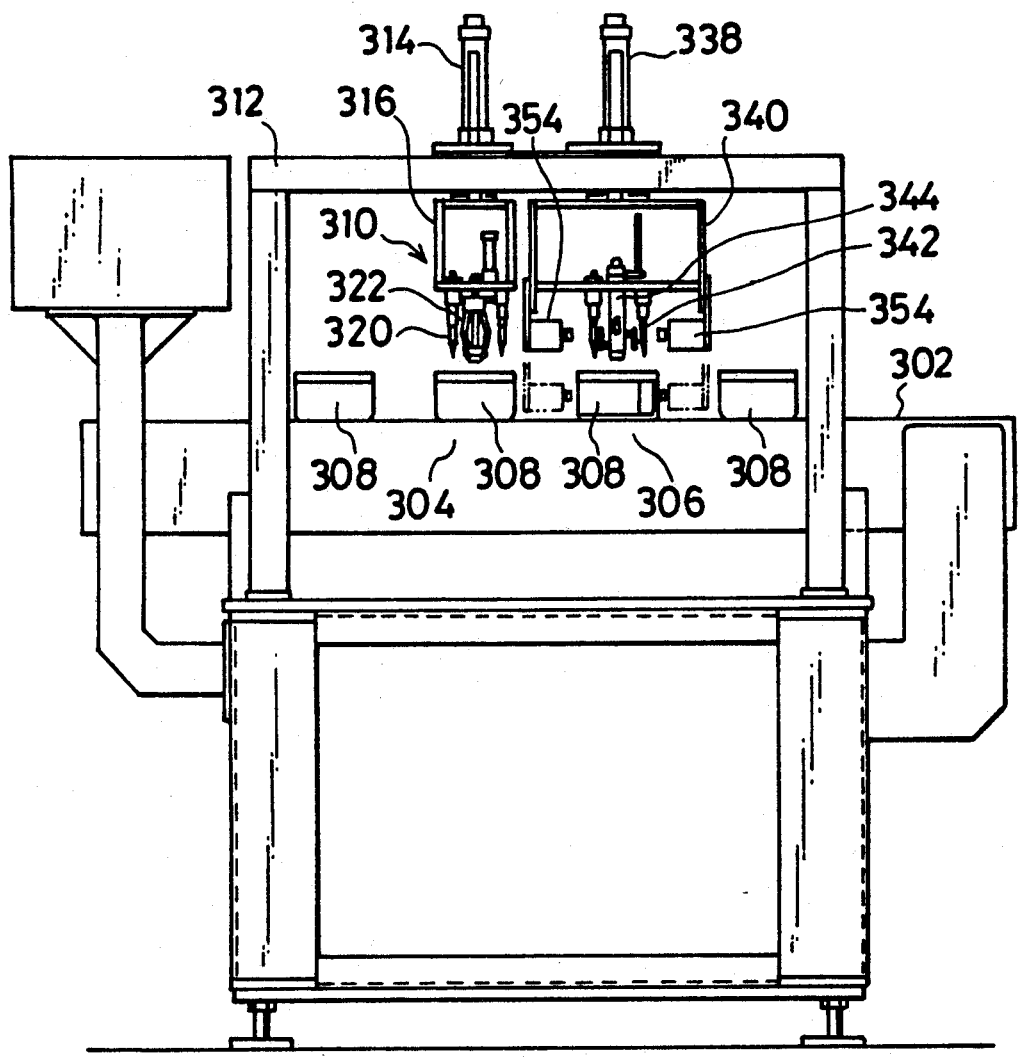
FIG. 16 is a front view of the embodiment shown in FIG. 15.
Figure 17:
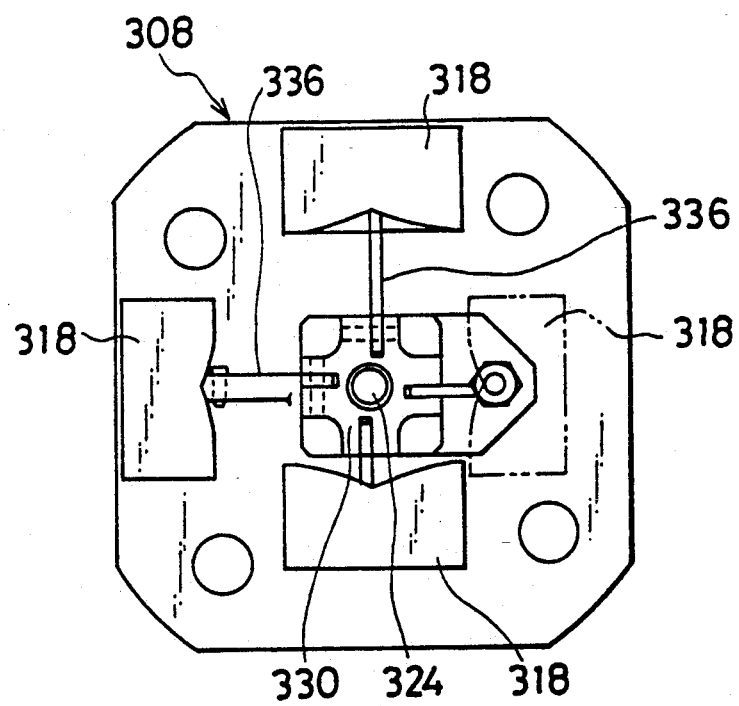
FIG. 17 is a plan view of resetting means.
Figure 18:
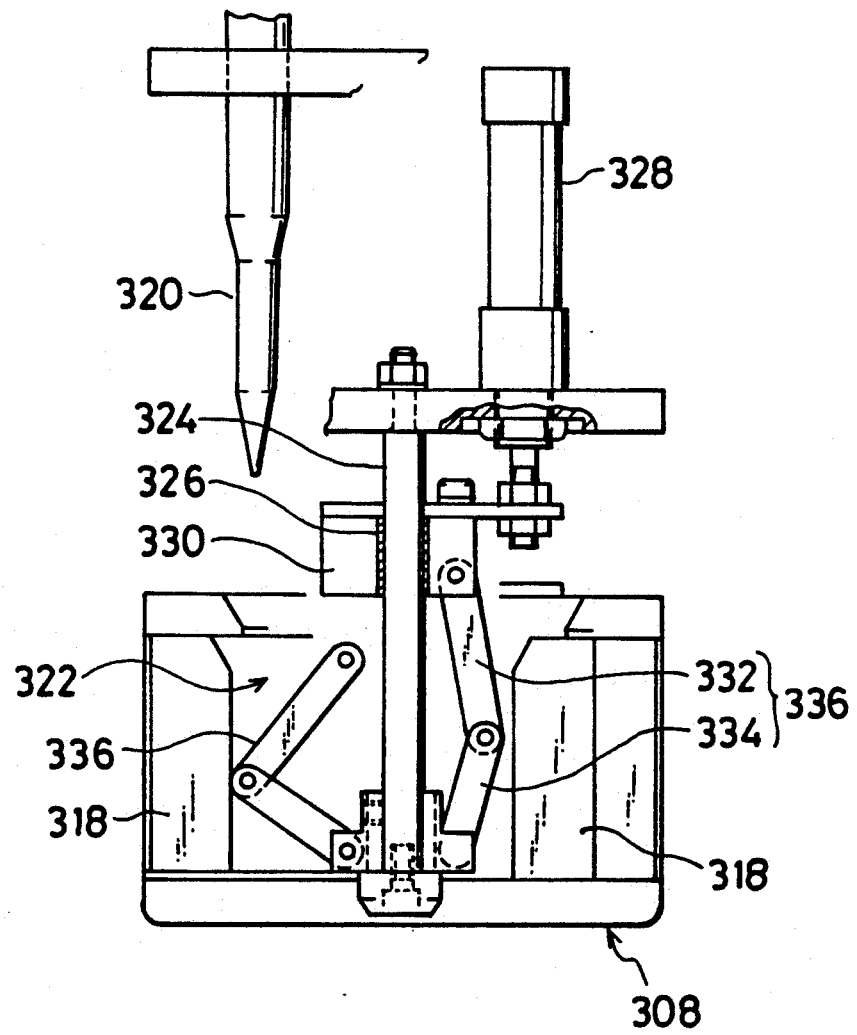
FIG. 18 is an illustration of the operation of the resetting means.
Figure 19:
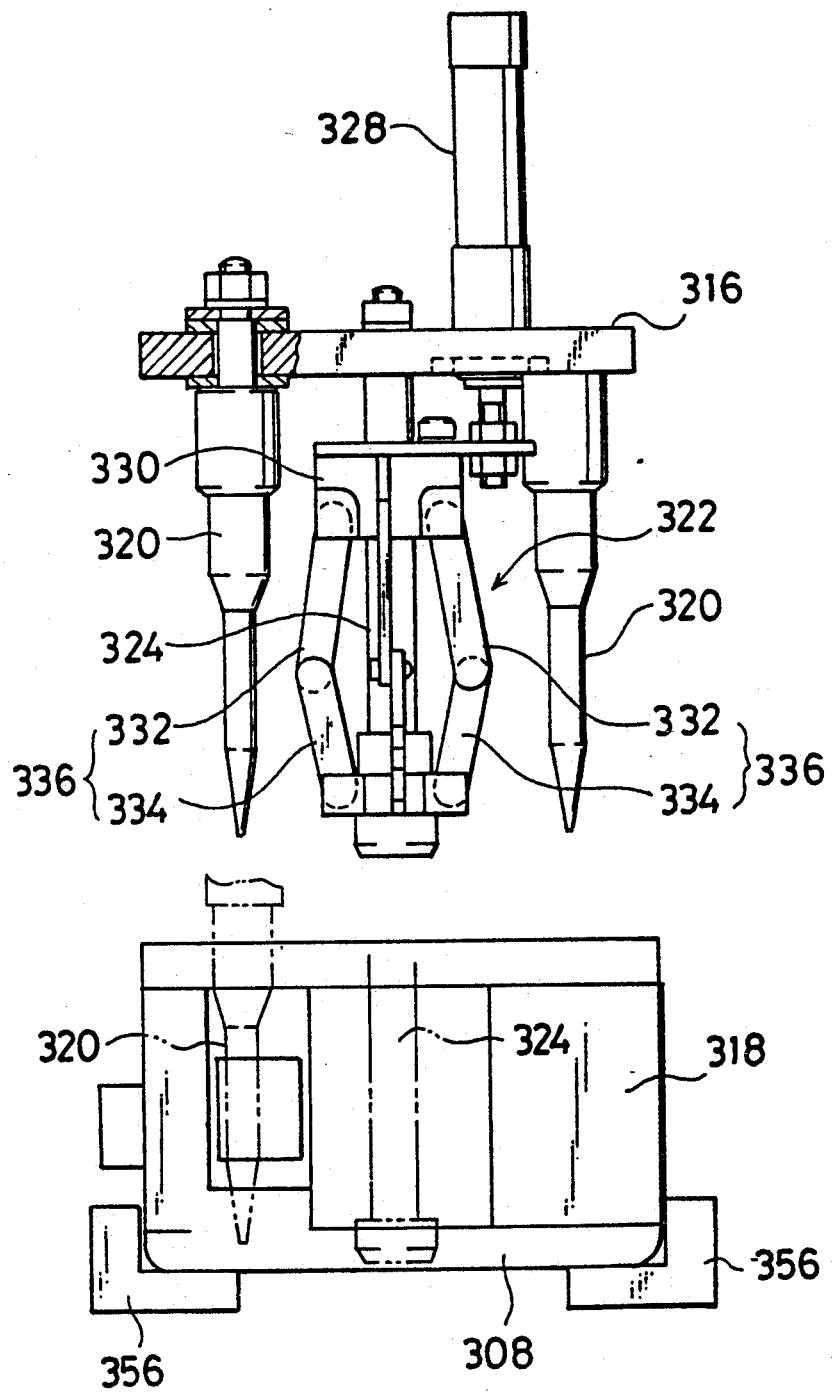
FIG. 19 is another illustration of the operation of the resetting means.

A resetting mechanism as illustrated in FIG. 14 may be used to retract the fingers 222, 224. Specifically, four cylinders 284 mounted on a frame 282 fixedly carry downwardly depending pawls 286. During the resetting operation, the frame 282 may be lowered with the pawls maintained in their advanced positions or positions where they are located toward each other, and subsequently, the pawls 286 can be retracted to reset the fingers 222, 224.

At a remodelling station, a pin 246 having a tapered tip (see FIG. 10) is inserted through the circular hole 242a in the top cover 242 and the hole 226a or 228a of a smaller diameter of either ratchet 226 or 228 which is disposed eccentric with respect to the circular hole 242a to disengage the ratchet 226 or 228 from the teeth 222c or 224c. Under this condition, a container model is disposed into the central portion of the holder body 220, and subsequently the fingers 222, 224 are driven toward the center until they contact the container model.

Figure 11:
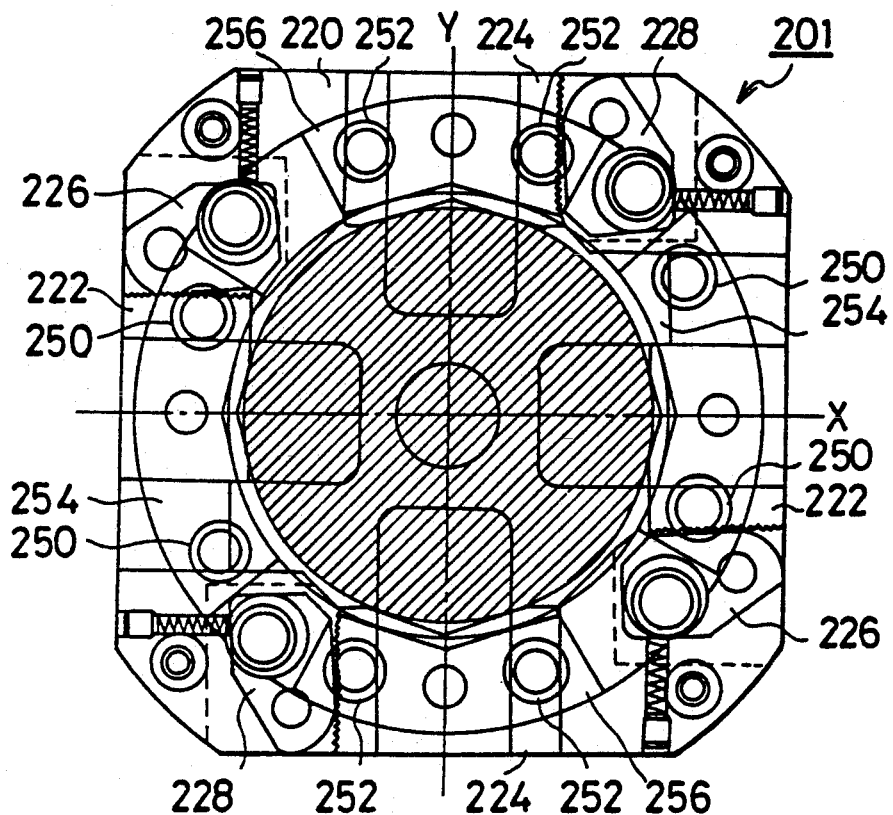
FIG. 11 is a plan view of a fourth form of container holder.
Figure 12:
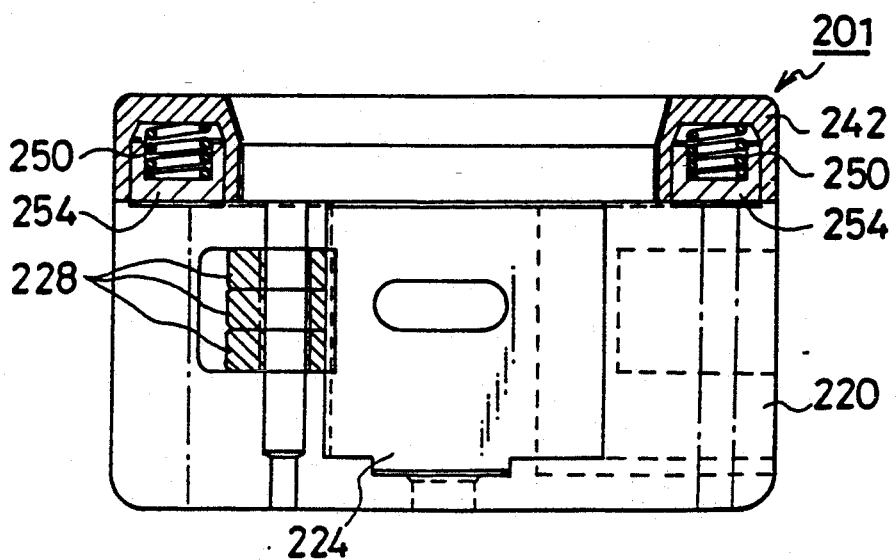
FIG. 12 is a side elevation, partly in section, of the container holder shown in FIG. 11.

FIGS. 11 and 12 show a fourth example of container holder. This embodiment includes fingers 222, 224 and ratchets 226, 228 which serve as stops for the fingers 222, 224, all of which are similar to those of the previous embodiment. In addition, this embodiment includes a mechanism for preventing any movement of the fingers 222, 224 upon impact Specifically, the top cover 242 houses springs 250, 252 at locations directly above the respective fingers 222, 224 and these springs act to urge the associated fingers 222, 224 against the bottom surface of the holder body 220 through abutments 254, 256. A remodelling operation of this embodiment takes place in the similar manner as in the third example.

FIGS. 15 to 21 show a remodelling apparatus according to another embodiment. As before, a remodelling line 302, which is connected to the usual container processing line 300, includes a resetting or home position returning station 304 and a remodelling station 306 where a remodelling operation of a container holder 308 takes place. The container holder 308 employed in this embodiment is substantially identical to that used in the embodiment shown in FIGS. 8 to 10 or the embodiment shown in FIGS. 11 and 12, except that the fingers (container holding means) mesh with ratchets to limit their movement in opposite directions.

The resetting station 304 includes a resetting apparatus 310, which comprises an elevatable frame 316 which is raised or lowered by a cylinder 314 secured to the top of a machine frame 312, four tapered pins 320 secured to the bottom surface of the frame 316 for disengaging the meshing engagement between fingers 318 and ratchets (not shown), and retraction means 322 for retracting the respective fingers 318 to their home positions. The retraction means 322 comprises a rod 324 secured to the bottom surface of the elevating frame 316 at its center, a sliding block 330 slidably fitted over the rod 324 with a bushing interposed therebetween and adapted to be raised or lowered by a cylinder 328, and four sets of links 336, each set including a first lever 332 having its one end rotatably carried by the sliding block 330 and a second lever 334 having its one end rotatably carried by the lower end of the rod 324 and having its other end connected to the free end of the first lever 332.

The remodelling station 306 includes an elevating frame 340 which is raised or lowered by a cylinder 338 in a similar manner as in the resetting station 304. Four tapered pins 342 are secured to the bottom of the elevating frame 340 for disengaging the meshing engagement between the fingers 318 and associated ratchets. A container model or remodelling jig 344 is detachably mounted at a location which is at the center defined by the four pins 342. The container model 344 includes a supporting post 346 having four faces, into which horizontal pins 348 are inserted at mutually different elevations, with each horizontal pin 348 fixedly carrying a vertical guide pin 350 on its free end. The supporting post 346 extends through a through-opening 340a formed in the center of the elevating frame 340, and its top end is held against rattling by a clamp 352.

Four pushers 354 (see FIG. 16) are fixedly mounted on the elevating frame 340 around its periphery for advancing the respective fingers 318 to given positions which depend upon configuration of a particular container. It is to be noted that these pushers 354 are disposed at an elevation which is substantially aligned with the elevation of the guide pins 350 on the container model 344.

In operation, the container holder 308 is fed to the remodelling line 302, and is stopped at the resetting station 304. The cylinder 314 is operated to lower the frame 316. As the frame 316 is lowered, the four tapered pins 320 and the retraction means 322 are also lowered in an integral manner (to a position shown in phantom line while maintaining their relationship as indicated in solid line in FIG. 19). The tapered pins 320 are then fitted into openings in the respective ratchets to disengage them from the fingers 318.

Subsequently, the cylinder 328 is operated to lower the sliding block 330. Thereupon, the link 336 will be collapsed (from the position shown to the right to the position shown to the left in FIG. 18), whereby the joint between the both levers 332 and 334 abuts against the finger 318 to drive it outward. As each finger 318 is driven in this manner, it comes to a stop upon abutment against a positioning member 356 (see FIG. 19) which is disposed outside the container holder 308. The position which the finger 318 assumes at this time represents the home position.

Figure 20:
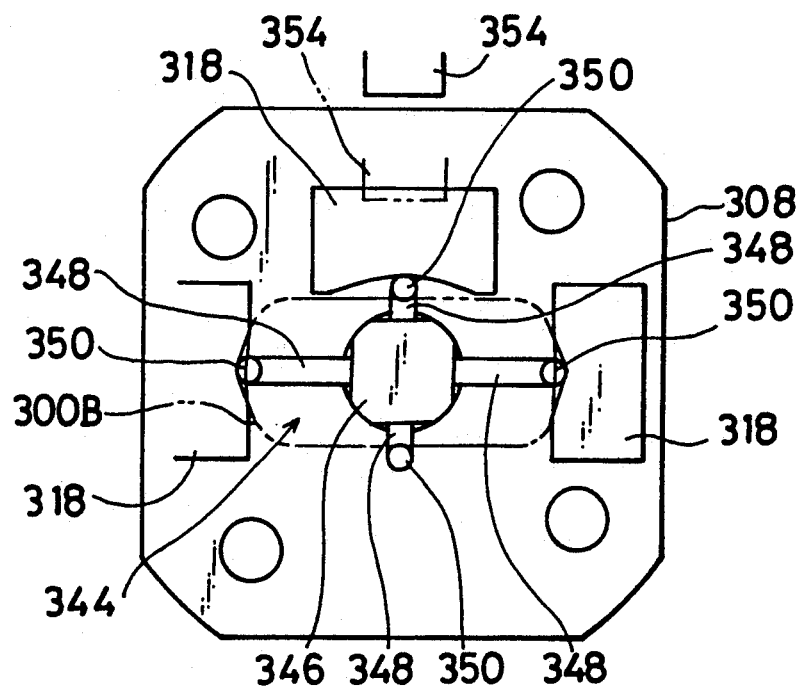
FIG. 20 is a plan view of a remodelling station.

The container holder 308 having its fingers 318 reset to their home positions is then held to the remodelling station 306. At the station 306, the cylinder 338 is operated to lower the frame 340. As the frame 340 is lowered, the container model 344 and the tapered pins 342 are also lowered in an integral manner. As illustrated in FIGS. 20 and 21, the guide pins 350 are disposed such that the container model 344 is slightly spaced outwardly of the outer profile of a particular container 300B which is received within the container holder 308. The respective ratchets are disengaged from the associated fingers 318 by the tapered pins 342 in the same manner as occurring in the resetting station 304. Subsequently, the pushers 354 are driven forward to drive the fingers 318 until they abut against the guide pins 350, whereupon the remodelling operation is completed. This embodiment achieves the similar functioning as that achieved by the preceding embodiments.

While the invention has been shown and described above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. An apparatus for remodelling a multi-purpose container holder, comprising:
   a container holder for receiving a container therein;

a plurality of container holding means disposed within the container holder and movable toward the center of the holder;

resetting means disposed on a remodelling line on which the container holder is conveyed for returning the container holding means to their home positions;

positioning means also disposed on the remodelling line for moving and positioning the container holding means; and container model insertion means for inserting a container model into the container holder so that after the container model is inserted into the container holder in which the container holding means have been reset to their home positions, said positioning means will cause the container holding means to be driven to move into abutment against the container model, thereby performing a positioning operation.

2. The apparatus according to claim 1, wherein the positioning of the container holding means takes place in reference to their home positions, which are defined by the most outwardly retracted positions within the container holder.

3. The apparatus according to claim 1, wherein the resetting means and positioning means each includes a first gear mounted on the container holding means, and a second gear mounted on an operating shaft and meshing with the first gear, the operating shaft being driven by a servo driver for rotation to perform the resetting and the positioning operation.

4. The apparatus according to claim 3 wherein the positioning takes place by rotating the operating shaft by means of the servo driver through a predetermined number of revolutions.

5. The apparatus according to claim 1, wherein the container holding means is mounted on a pin cylinder which is slidably fitted in a cylinder bore in the container holder, air being introduced into the cylinder bore to return the container holding means to its home positions.

6. The apparatus according to claim 1, wherein said positioning means includes a push pin is inserted through an open end of the cylinder bore to drive a pin cylinder inward until it abuts against the container model, thereby positioning the container holding means.

7. The apparatus according to claim 1, wherein the container model has an outer profile which is slightly greater than a particular container which is received and held in the container holder.

8. The apparatus according to claim 1, wherein the container holding means is associated with limit means which restricts a movement thereof when the apparatus is inoperable.

9. The apparatus according to claim 8, wherein the limit means comprises an O-ring fitted around a pin cylinder which moves integrally with the container holding means.

10. The apparatus according to claim 8, wherein the resetting means and positioning means each includes a first gear mounted on the container holding means, and a second gear mounted on an operating shaft and meshing with the first gear, the operating shaft being driven by a servo driver for rotation to perform the resetting and the positioning operation and, wherein the limit means comprises a leaf spring which resiliently bears against the operating shaft to restrict its rotation.

11. The apparatus according to claim 1, wherein the remodelling operation takes place on a remodelling line which is connected to a container processing line.

12. The apparatus according to claim 11, wherein the remodelling line includes a resetting station where the container holding means are returned to their home positions, and a remodelling station where a positioning of the container holding means takes place.

13. The apparatus according to claim 8, wherein the limit means comprises teeth formed on a lateral face of each container holding means, and a ratchet disposed to be rotatable about a fulcrum and urged by a spring against the teeth on the container holding means for meshing engagement therewith.

14. The apparatus according to claim 13, wherein the container holding means and the associated ratchet are formed with openings which are eccentric from each other, a tapered pin being inserted into these openings to disengage the meshing engagement between the teeth on the container holding means and the ratchet.

15. The apparatus according to claim 1, wherein the resetting means comprises an elevatable frame, a cylinder mounted on the frame, and a pawl mounted on each cylinder and is driven by the cylinder for reciprocatory motion in the horizontal direction, the frame being lowered while maintaining the respective pawls at advanced positions located toward the center, thereby allowing the pawls to be inserted into the container holder, and subsequently the pawls are retracted to return the container holding means to their home positions.

16. The apparatus according to claim 1, wherein the resetting means comprises an elevating frame, a tapered pin secured to the bottom surface of the frame for disengaging the meshing engagement between the teeth on the container holding means and an associated ratchet, and retraction means for retracting each of the container holding means, the retraction means comprising a rod secured to the bottom surface of the elevating frame at its center, a sliding block which is elevatable with respect to the rod, and a linkage including a pair of levers which are connected together at their one end and connected to the end of the rod and the sliding block, respectively, at their remote ends.

17. The apparatus according to claim 1, wherein the positioning means comprises an elevating frame, a tapered pin secured to the bottom surface of the frame for disengaging the meshing engagement between the teeth on the container holding means and an associated ratchet, and a pusher operable from the exterior to push each of the container holding means.

18. The apparatus according to claim 1, wherein the container model comprises a plurality of horizontal pins mounted on the outer faces of a supporting post, and a vertical guide pin secured to the outer extremity of each horizontal pin, a profile defined by the outer surface of the guide pins being slightly greater than the outer profile of a container received and held within the container holder.

19. The apparatus according to claim 17, wherein a container model is detachably mounted on the elevating frame of the positioning means.

* * * * *